US012225007B2

(12) United States Patent
Borbolla Galindo

(10) Patent No.: US 12,225,007 B2
(45) Date of Patent: *Feb. 11, 2025

(54) SYSTEMS AND METHODS FOR USING A NETWORK ACCESS DEVICE TO SECURE A NETWORK PRIOR TO REQUESTING ACCESS TO THE NETWORK BY THE NETWORK ACCESS DEVICE

(71) Applicant: Fortinet, Inc., Sunnyvale, CA (US)

(72) Inventor: Emilio Borbolla Galindo, Merida (MX)

(73) Assignee: Fortinet, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/396,393

(22) Filed: Dec. 26, 2023

(65) Prior Publication Data

US 2024/0129308 A1 Apr. 18, 2024

Related U.S. Application Data

(63) Continuation of application No. 17/185,542, filed on Feb. 25, 2021, now Pat. No. 11,916,902.

(51) Int. Cl.
*H04L 9/40* (2022.01)

(52) U.S. Cl.
CPC ...... *H04L 63/0876* (2013.01); *H04L 63/0236* (2013.01); *H04L 63/0272* (2013.01); *H04L 63/1433* (2013.01)

(58) Field of Classification Search
CPC ............ H04L 63/0876; H04L 63/0236; H04L 63/0272; H04L 63/1433
USPC ............................................................ 726/4
See application file for complete search history.

(56) References Cited

U.S. PATENT DOCUMENTS

| | | | | |
|---|---|---|---|---|
| 8,707,395 | B2* | 4/2014 | Sahay | H04L 63/08 726/4 |
| 9,043,879 | B1* | 5/2015 | Reeves | H04W 12/08 726/4 |
| 2005/0278777 | A1* | 12/2005 | Loza | H04L 63/1433 726/4 |
| 2009/0307753 | A1* | 12/2009 | Dupont | H04L 63/08 726/11 |
| 2011/0277019 | A1* | 11/2011 | Pritchard, Jr. | H04L 63/0815 726/8 |
| 2015/0128223 | A1* | 5/2015 | Magri | H04L 63/10 726/4 |
| 2016/0165449 | A1* | 6/2016 | Poisner | H04W 12/12 726/4 |
| 2018/0213574 | A1* | 7/2018 | Bareket | H04W 40/246 |
| 2020/0067949 | A1* | 2/2020 | Bansal | H04L 63/1416 |
| 2021/0160220 | A1* | 5/2021 | Rappaport | H04L 63/0281 |

* cited by examiner

*Primary Examiner* — Badri Narayanan Champakesan
(74) *Attorney, Agent, or Firm* — Jaffery Watson Hamilton & DeSanctis LLP

(57) ABSTRACT

Various approaches for securing networks against access from off network devices. In some cases, embodiments discussed relate to systems and methods for identifying potential threats included in a remote network by a network access device prior to requesting access to a known secure network via the remote network.

21 Claims, 7 Drawing Sheets

SYSTEMS AND METHODS FOR USING A NETWORK ACCESS DEVICE TO SECURE A NETWORK PRIOR TO REQUESTING ACCESS TO THE NETWORK BY THE NETWORK ACCESS DEVICE

CROSS REFERENCE TO RELATED APPLICATION

The present application is a continuation of U.S. patent application Ser. No. 17/185,542, filed Feb. 25, 2021. The entirety of the aforementioned patent application is incorporated herein by reference for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2021-2023, Fortinet, Inc.

FIELD

Embodiments discussed generally relate to securing networks against access from off network devices. In some cases, embodiments discussed relate to systems and methods for identifying potential threats included in a remote network by a network access device prior to requesting access to a known secure network via the remote network.

BACKGROUND

It is not uncommon for corporate devices to be taken on the road and used to access the corporate network from remote locations. Such use of a corporate device invites the possibility that nefarious access to the corporate network may be achieved via an unsecure device on the remote access network via the corporate device.

Thus, there exists a need in the art for more advanced approaches, devices and systems for monitoring and addressing network functionality.

SUMMARY

Various embodiments provide systems and methods for securing networks against access from off network devices. In some cases, embodiments discussed relate to systems and methods for identifying potential threats included in a remote network by a network access device prior to requesting access to a known secure network via the remote network.

This summary provides only a general outline of some embodiments. Many other objects, features, advantages and other embodiments will become more fully apparent from the following detailed description, the appended claims and the accompanying drawings and figures.

BRIEF DESCRIPTION OF THE DRAWINGS

A further understanding of the various embodiments may be realized by reference to the figures which are described in remaining portions of the specification. In the figures, similar reference numerals are used throughout several drawings to refer to similar components. In some instances, a sub-label consisting of a lower-case letter is associated with a reference numeral to denote one of multiple similar components. When reference is made to a reference numeral without specification to an existing sub-label, it is intended to refer to all such multiple similar components.

DETAILED DESCRIPTION

Figure 1A:
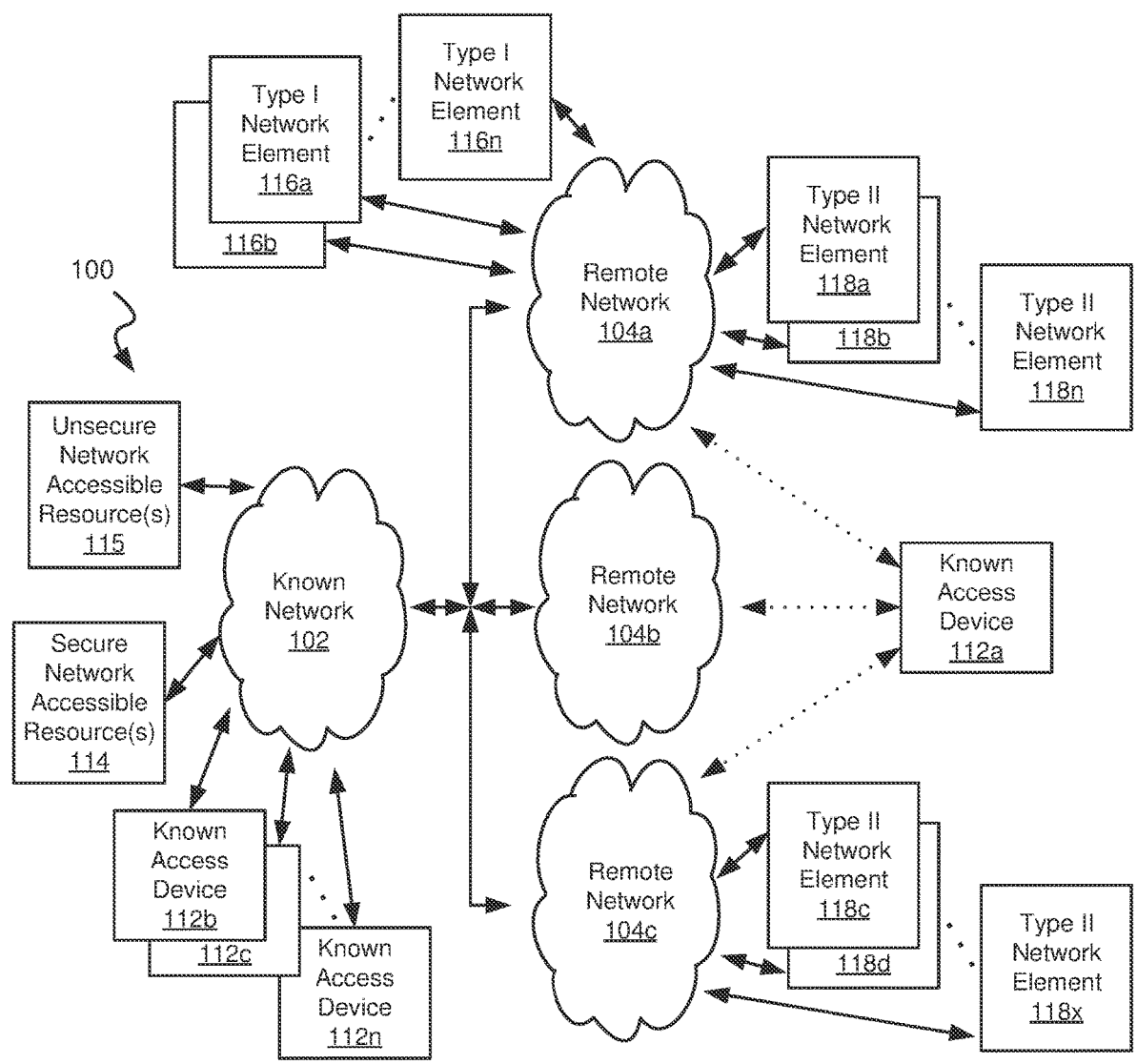
FIGS. 1A-1C illustrate a network architecture in accordance with some embodiments.

Various embodiments provide systems and methods for securing networks against access from off network devices. In some cases, embodiments discussed relate to systems and methods for identifying potential threats included in a remote network by a network access device prior to requesting access to a known secure network via the remote network.

The popularity of telework has increased dramatically. Such telework has increased the possibility of a secure network becoming open to attack via one or more unsecure devices on a remote network through which the telework is being supported. As just some examples, a remote network may include one or more Internet of Things (IoT) type of device such as, for example, televisions, cameras, microphones, and the like.

In a typical scenario, a secure corporate device is connected directly to a secure corporate network. In this scenario one network administrator controls both the secure corporate device and the secure corporate network. This network administrator can assure that access to and from the secure corporate device is carefully guarded using access credentials. However, in the growing telework scenarios, the secure corporate device is taken outside of the secure corporate network by a user, and used to access the secure corporate network via one or more remote networks that are not under control of the network administrator. For example, the user may access the secure corporate network using the secure network device (e.g., a corporate access device known to the administrator of the secure corporate network) via a home network maintained by the user. This home network may connect a number of network devices, that in some cases have either not been secured or are incapable of being secured. In such a scenario, allowing access via the home network raises the potential of threat to the secure corporate network via access through one of the unsecured network devices on the home network.

Terminology

The phrase "known network" or "on-network" is used in its broadest sense to mean a network that is controlled, governed, and/or owned by an entity that is responsible for the security of the network. Thus, for example, a known network may be a corporate network that is controlled by a network administration of the corporation. As another example, a known network may include all network devices within a corporate network that are protected by a network security appliance (e.g., FORTIGATE). Such a known network includes a number of network devices that are known to and/or approved of by the aforementioned network administration. In contrast, the phrase "remote network" or "off-network" is a network that includes one or more elements that are: not known to, not governed by, and/or not controlled by the entity that is responsible for the known network. Thus, for example, a remote network may be a home network that is not controlled by the entity that is not responsible for the security of the known network. The phrase "known access device" is a device that includes a module governing access to a known network via a remote network.

The terms "connected" or "coupled" and related terms, unless clearly stated to the contrary, are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

As used herein, a "network element" is used in its broadest sense to mean any device in virtual or physical form that is included in a network. Thus, network elements may include, but are not limited to, IoT devices, cameras, printers, scanners, fax machines, personal computers, phones, or the like. Based upon the disclosure provided herein, one of ordinary skill in the art will recognize a variety of network elements that may be used in relation to various embodiments.

As used herein, a "network appliance" or a "network device" generally refers to a device or appliance in virtual or physical form that is operable to perform one or more network functions. Such a network device may, for example, be a network security device that may reside within the particular network that it is protecting or network security may be provided as a service with the network security device residing in the cloud. Some network security devices may be implemented as general-purpose computers or servers with appropriate software operable to perform the one or more security functions. Other network security devices may also include custom hardware (e.g., one or more custom Application-Specific Integrated Circuits (ASICs)). For example, while there are differences among network security device vendors, network security devices may be classified in three general performance categories, including entry-level, mid-range, and high-end network security devices. Each category may use different types and forms of central processing units (CPUs), network processors (NPs), and content processors (CPs). NPs may be used to accelerate traffic by offloading network traffic from the main processor. CPs may be used for security functions, such as flow-based inspection and encryption. Entry-level network security devices may include a CPU and no co-processors or a system-on-a-chip (SoC) processor that combines a CPU, a CP and an NP. Mid-range network security devices may include a multi-core CPU, a separate NP Application-Specific Integrated Circuits (ASIC), and a separate CP ASIC. At the high-end, network security devices may have multiple NPs and/or multiple CPs. A network security device is typically associated with a particular network (e.g., a private enterprise network) on behalf of which it provides the one or more security functions. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VoIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), network access control appliances (e.g., FORTINAC family of network access control appliances), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), virtual or physical sandboxing appliances (e.g., FORTISANDBOX family of security appliances), and DoS attack detection appliances (e.g., the FORTIDDOS family of DoS attack detection and mitigation appliances).

Some embodiments discussed herein can be implemented as software instructions executable by a hardware processor.

In some embodiments, such software instructions form part of an operating system providing software control in a networking environment. One example of such an operating system is FORTIOS family of operating systems offering control of various network functions including security fabric. Of note, while the embodiments discussed herein are generally described as being implemented as software instructions executable by a hardware processor, it will be noted that such is not limiting and that other embodiments implemented with hardware accelerators are possible in accordance with other embodiments.

Example embodiments will now be described more fully hereinafter with reference to the accompanying drawings, in which exemplary embodiments are shown. This disclosure may, however, be embodied in many different forms and should not be construed as limited to the embodiments set forth herein.

Thus, for example, it will be appreciated by those of ordinary skill in the art that the diagrams, schematics, illustrations, and the like represent conceptual views or processes illustrating systems and methods embodying various aspects of the present disclosure. The functions of the various elements shown in the figures may be provided through the use of dedicated hardware as well as hardware capable of executing associated software and their functions may be carried out through the operation of program logic, through dedicated logic, through the interaction of program control and dedicated logic.

Various embodiments provide methods for reducing network threats. The methods include receiving a request to access a known network; scanning a remote network through which access to the known network is to be established, where the scanning is configured to identify an unsecure network element on the remote network; based at least in part on identifying at least one unsecure network element on the remote network, denying access to the known network; and based at least in part upon on failure to identify any unsecure network element on the remote network, requesting a grant of access from the known network to the processing device.

In some instances of the aforementioned embodiments, access by the processing device to the known network is granted upon a combination of the requesting a grant of access from the known network to the processing device and a correct authorization credential presented by the processing device to the known network. In various instances of the aforementioned embodiments, the unsecure network element is an Internet of Things (IoT) device. In some instances of the aforementioned embodiments, administration of the processing device and the known network is controlled by a common administration entity. In various instances of the aforementioned embodiments, the methods further include: upon denying access to the known network by the processing device, providing a message to a user of the processing device requesting the user to access the known network via another remote network.

In some instances of the aforementioned embodiments, the methods further include: mitigating a security issue of the unsecure network element; and based at least in part upon mitigating the security issue of the unsecure network element, requesting a grant of access from the known network to the processing device. In some cases, mitigating a security issue of the unsecure network element includes disconnecting, by the processing device, the processing device from the current remote network and connecting, by the processing device, the processing device to another remote network. In various cases, mitigating a security issue of the unsecure network element includes starting a virtual private network application. In such cases, requesting the grant of access from the known network to the processing device is done over a virtual private network. In yet other cases, mitigating a security issue of the unsecure network element includes isolating the processing device from the unsecure network element and/or blocking access to the processing device from the unsecure network element. Such mitigation may include two or more of the aforementioned processes.

In various instances of the aforementioned embodiments, the methods further include: using, by the processing device, a network connection between the processing device and the known network; and while using the network connection between the processing device and the known network, scanning the remote network through which access to the known network is established, wherein the scanning is configured to identify an unsecure network element on the remote network. In some cases, such methods further include: upon identifying an unsecure network element on the remote network while using the network connection between the processing device and the known network, disconnecting and/or isolating, by the processing device, the processing device from the known network. In some cases, the methods further include: upon disconnecting the processing device from the known network by the processing device, providing a message to a user of the processing device requesting the user to access the known network via another remote network.

Other embodiments provide systems that include: a processing resource, and a non-transitory computer-readable medium coupled to the processing resource. The non-transitory computer-readable medium has stored thereon instructions that when executed by the processing resource cause the processing resource to: receive a request to access a known network; scan a remote network through which access to the known network is to be established, where the scanning is configured to identify an unsecure network element on the remote network; based at least in part on identifying at least one unsecure network element on the remote network, deny access to the known network; and based at least in part upon on failure to identify any unsecure network element on the remote network, request a grant of access from the known network to the processing device.

In some instances of the aforementioned embodiments, access to the known network is granted upon a combination of the requesting a grant of access from the known network to the processing device and a correct authorization credential presented by the processing device to the known network. In various instances of the aforementioned embodiments, the unsecure network element is an Internet of Things (IoT) device.

Yet other embodiments provide a non-transitory computer-readable storage medium embodying a set of instructions, which when executed by one or more processing resources of a computer system, causes the one or more processing resources to perform a method comprising: receiving a request to access a known network; scanning a remote network through which access to the known network is to be established, where the scanning is configured to identify an unsecure network element on the remote network; based at least in part on identifying at least one unsecure network element on the remote network, denying access to the known network; and based at least in part upon on failure to identify any unsecure network element on the remote network, requesting a grant of access from the known network to the processing device.

In some instances of the aforementioned embodiments, the non-transitory computer-readable storage medium embodying the set of instructions, which when executed by one or more processing resources of the computer system, causes the one or more processing resources to perform the method further comprising: upon denying access to the known network by the processing device, providing a message to a user of the processing device requesting the user to access the known network via another remote network. In various instances of the aforementioned embodiments, the non-transitory computer-readable storage medium embodying the set of instructions, which when executed by one or more processing resources of the computer system, causes the one or more processing resources to perform the method further comprising: mitigating a security issue of the unsecure network element; and based at least in part upon mitigating the security issue of the unsecure network element, requesting a grant of access from the known network to the processing device. In some cases, mitigating the security issue of the unsecure network element includes starting a virtual private network application, and wherein requesting the grant of access from the known network to the processing device is done over a virtual private network.

In various instances of the aforementioned embodiments the method further includes: using a network connection between the processing device and the known network; and while using the network connection between the processing device and the known network, scanning the remote network through which access to the known network is established, where the scanning is configured to identify an unsecure network element on the remote network. In some instances of the aforementioned embodiments, the methods further include: upon identifying an unsecure network element on the remote network while using the network connection between the processing device and the known network, disconnecting and/or isolating the processing device from the known network.

Turning to FIG. 1A, a network architecture 100 is shown in accordance with various embodiments. Network architecture 100 includes a known network 102 and a number of remote networks 104 (e.g., remote network 104a, remote network 104b, and remote network 104c). Such networks may each include a number of network devices as are known in the art. Further, the number of remote networks 104 is not limited to three, but may be one, two, or a number greater than three.

Known network 102 may, for example, be a corporate network. Known network 102 includes a number of unsecure network accessible resource(s) 115 and a number of secure network accessible resource(s) 114. Secure network accessible resource(s) 114 may include a number of network resources, gateways, databases, applications, or the like that require a defined level of authorization and/or security to access. This defined level of security is controlled by a network administration that defines security within known network 102. Thus, to access secure network accessible resource(s) 114, an accessing device must become authorized to known network 102. Such authorization may involve, but is not limited to, presenting a security credential to known network. In contrast, unsecure network accessible resource(s) 115 include a number of network resources, gateways, databases, or the like that do not require authorization to access. Thus, to access unsecure network accessible resource(s) 115, an accessing device is not required to be authorized to known network 102.

A number of known access devices 112 (known access device 112b, known access device 112c, . . . , known access device 112n) are connected to known network 102 at any given time. Such devices are directly connected to known network 102 and allow users to access one or both of secure network accessible resource(s) 114 and unsecure network accessible resource(s) 116 depending upon authorization. In one embodiment, known access devices 112 are owned and controlled by the same entity that owns and controls known network 102. In such an embodiment, the users may be employees of the entity. Based upon the disclosure provided herein, one of ordinary skill in the art will recognize a variety of relationships between users, known access devices 112, and known network 102 that may be possible in accordance with different embodiments.

One or more of known access devices 112 (e.g., known access device 112a) can be removed from known network 102, and connected to one or more of remote networks 104. Known access device 112a can be used to access one or both of secure network accessible resource(s) 114 and unsecure network accessible resource(s) 116 of known network 102 via a remote network 104. Such access to secure network accessible resource(s) 114 and/or unsecure network accessible resource(s) 116 of known network 102 is based at least in part upon other network devices included in the particular remote network 104 through which known access device 112a is attempting to connect to known network 102.

Remote network 104a is connected to a number of type I network elements 116 (e.g., type I network element 116a, type I network element 116b, . . . , and type I network element 116n), and to a number of type II network elements 118 (e.g., type II network element 118a, type II network element 118b, . . . , and type II network element 118n). As used herein, a type I network element 116 is a network element that is considered a potential threat and without purpose to known network 102. For example, a type I network element may be, but is not limited to, an IOT device such as a television that is deemed by the entity controlling known network 102 not to have utility to a user of secured network device 112a when performing tasks for an entity controlling known network 102.

In contrast, a type II network element 118 is considered a potential threat, but with some purpose to known network 102. For example, a type II network element 118 may be, but is not limited to, a printer or scanner that would have use to a user of secured network device 112a when performing tasks for an entity controlling known network 102. Based upon the disclosure provided herein, one of ordinary skill in the art will recognize a variety of type II network elements that may be used and processed in accordance with different embodiments.

Remote network 104b does not include any devices other than known access device 112a and a network gateway device (not shown). Remote network 104c is connected to a number of type II network elements 118 (e.g., type II network element 118c, type II network element 118d, . . . , and type II network element 118x). Access to known network 102 by known access device 112a will be allowed depending upon which or remote networks 104 is used, any mitigation that may be performed on one or both of type I network elements 116 and type II network elements 118, and an access policy implemented by known network 102 as more fully described below.

Figure 1B:
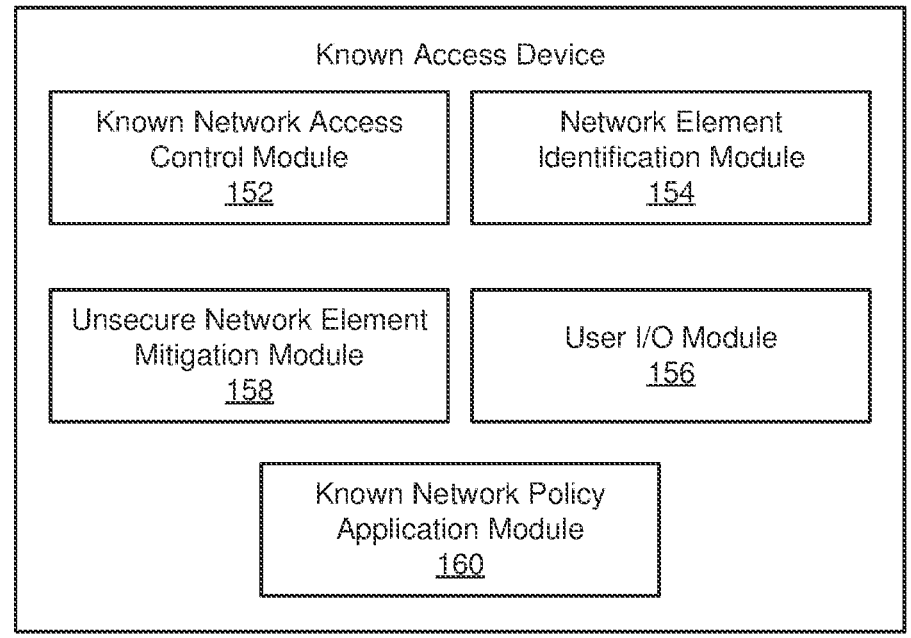

Turning to FIG. 1b, a conceptual drawing of a known access device 142 is shown in accordance with some embodiments. Known access device 142 may be used in place of one or more of known access devices 112. As shown, known access device 142 includes a known network access control module 152. In some embodiments, known network access control module 152 includes instructions executable by a processor (not shown) of known access device 142 to receive a request to access known network 102. In some cases, known network access control module 152 additionally prepares an authorization credential that will be presented to known network 102 as part of requesting access.

Known network access control module 152 determines whether the requested connection will result in a direct connection to known network 102, or whether the request connection will be made via a remote network 104. Where the attempted connection to known network 102 is behind a secure gateway (i.e., is on-network), the user or the devices has been authenticated against a AAA server (i.e., an authentication server) or is otherwise accessing from within known network 102 (i.e., a direct connection), known network access control module 152 provides the authorization credential for known network 102 to the network gateway of known network 102. Where the authorization is correct, known network 102 and known access device 142 perform a connection to known network 142.

Known access device 142 is allowed continual access to the known network until a change in the network connection is detected by known network access control module 152. Such a change in network connection can include, but is not limited to, any process of disconnecting known access device 142 from known network 102. Once a change in network connection is detected, known network access control module 152 disconnects and/or isolates (e.g., blocks all communication) known access device 142 from known network 102.

Alternatively, where known network access control module 152 determines that the attempted connection to known network 102 is via a remote network 104 (i.e., an indirect connection), a network element identification module 154 scans remote network 104 through known access device 142 is requesting connection to known network 102 for any type I network elements 116. Network element identification module 154 may use any process and/or circuitry known in the art for identifying network elements 116, 118 on the selected remote network 104. Type I network elements 116 may include any network element that is not identified by the module as acceptably secure. In some embodiments, one or more types of network printers and/or one or more types of network scanners may be considered acceptably secure (and thus designated type II network elements 118), and in the same embodiment, all other network elements are not considered acceptably secure (and thus designated type I network elements 116).

A known network policy application module 160 is programmable to include a list of network elements that are considered type I network elements 116 because either they do not offer a meaningful threat to known network 102 and/or because they are needed by a user accessing known network 102 and any threat is understood and controlled. A network administration associated with user network 102 may program known network policy application module 160, and known network policy application module 160 is accessible to network element identification module 154 for use in detecting and classifying network elements 116, 118 in the selected remote network 104.

Any network elements 116, 118 on remote network 104 through which known access device 142 is attempting to access known network 102 that are not identified as acceptably secure in network element identification module 154 are identified as "unsecure" network elements. Network element identification module 154 determines whether any unsecure network elements are included in remote network 104 through which known access device 142 is attempting to access known network 102. Where no unsecure network elements are detected in remote network 104, network element identification module 154 signals the condition to known network access control module 152 that then presents the authorization credential from known access device 142 to known network 102. Where the authorization is correct, known network 102 and known access device 142 perform a connection to known network 102.

Alternatively, in some embodiments where network element identification module 154 identifies one or more unsecure network elements (i.e., a type I network element 118) on remote network 104, network element identification module 154 signals known network access control module 152 that disconnects from known access device 142 from known network 102, and signals the disconnect to a user I/O module 156. In response, user I/O module 156 provides a message to a user of known access device 142 to use another remote network 104 to access known network 102. User I/O module may control one or more of an audio speaker or a display included as part of known access device 142 to provide the message to the user.

In other embodiments where network element identification module 154 identifies the addition of an unsecure network element (i.e., a type I network element 118) when initially considering connection to known network 102, network element identification module 154 signals known unsecure network element mitigation module 158 of the condition. In turn, network element mitigation module 158 operates to cure any of the identified unsecure network elements and returns a message to network element identification module 154 of its success or failure in curing. Where unsecure network element mitigation module indicates 158 a cure, the newly identified unsecured network element is ignored and the connection between known access device 142 and known network 102 is made. Alternatively, where unsecure network element mitigation module indicates 158 a failure to cure or remediate, network element identification module 154 signals the failure to cure to known network access control module 152. In turn, network access control module 152 denies the connection between known access device 142 and known network 102. Network access control module 152 further signals the denial to user I/O module 156. In response, user I/O module 156 provides a message to a user of known access device 142 to use another remote network 104 to access known network 102.

Known access device 142 is allowed continual access to known network 102 via remote network 104 until a change in the network connection is detected by known network access module 152. Such a change in network connection can include, but is not limited to, addition of an unsecure network element to remote network 104 or a change in connection to known network 102. Such a change in connection may be, but is not limited to, any process of disconnecting known access device 142 from known network 102. Once a change in network connection is detected by known network access control module 152, known access device 142 is disconnected and/or isolated (e.g., all communication from known access device 142 is blocked) from known network 102.

Network element identification module 154 continues to operate while known access device 142 is connected to known network 102 via remote network 104. In some embodiments where network element identification module 154 identifies the addition of an unsecure network element (i.e., a type I network element 118) since the last time a scan was performed, network element identification module 154 signals known network access control module 152 that disconnects from known access device 142 from known network 102, and signals the disconnect to a user I/O module 156. In response, user I/O module 156 provides a message to a user of known access device 142 to use another remote network 104 to access known network 102.

In other embodiments where network element identification module 154 identifies the addition of an unsecure network element (i.e., a type I network element 118) since the last time a scan was performed, network element identification module 154 signals known unsecure network element mitigation module 158 of the condition. In turn, network element mitigation module 158 operates to cure any of the identified unsecure network elements and returns a message to network element identification module 154 of its success or failure in curing. Where unsecure network element mitigation module indicates 158 a cure, the newly identified unsecured network element is ignored and the connection between known access device 142 and known network 102 continues. Alternatively, where unsecure network element mitigation module indicates 158 a failure to cure, network element identification module 154 signals the failure to cure to known network access control module 152. In turn, network access control module 152 disconnects known access device 142 from known network 102. Network access control module 152 further signals the disconnect to user I/O module 156. In response, user I/O module 156 provides a message to a user of known access device 142 to use another remote network 104 to access known network 102.

Figure 1C:
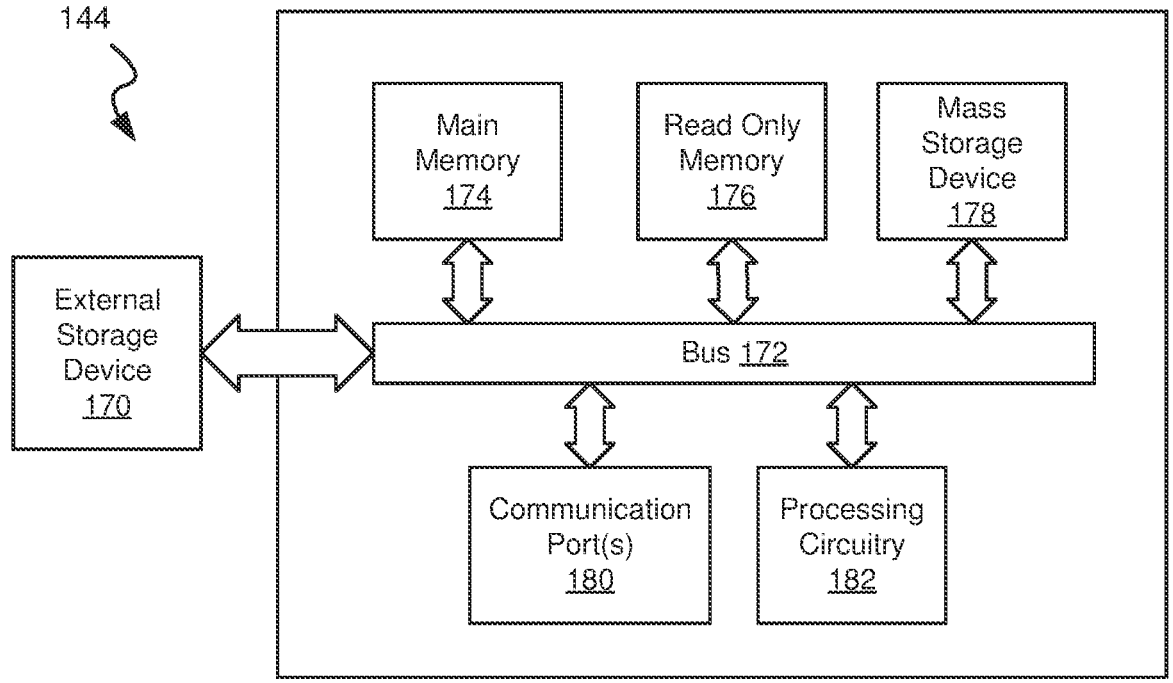

Turning to FIG. 1C, an example computer system 144 in which or with which embodiments of the present disclosure may be utilized is shown. As shown in FIG. 1C, computer system 144 includes an external storage device 170, a bus 172, a main memory 174, a read-only memory 176, a mass storage device 178, one or more communication ports 180, and one or more processing resources (e.g., processing circuitry 182). In one embodiment, computer system 144 may represent some portion of a known access device 142. Those skilled in the art will appreciate that computer system 144 may include more than one processing resource and communication port 180. Non-limiting examples of processing circuitry 182 include, but are not limited to: Intel Quad-Core, Intel i3, Intel i5, Intel i7, Apple M1, AMD Ryzen, or AMD® Opteron® or Athlon MP® processor(s), Motorola® lines of processors, FortiSOC™ system on chip processors or other future processors. Processor 1070 may include various modules associated with embodiments of the present disclosure.

Communication port 180 can be any of an RS-232 port for use with a modem-based dialup connection, a 10/100 Ethernet port, a Gigabit, 10 Gigabit, 25 G, 40 G, and 100 G port using copper or fiber, a serial port, a parallel port, or other existing or future ports. Communication port 180 may be chosen depending on a network, such as a Local Area Network (LAN), Wide Area Network (WAN), or any network to which the computer system connects.

Memory 174 can be Random Access Memory (RAM), or any other dynamic storage device commonly known in the art. Read only memory 176 can be any static storage device(s) e.g., but not limited to, a Programmable Read Only Memory (PROM) chips for storing static information e.g. start-up or BIOS instructions for the processing resource.

Mass storage device 178 may be any current or future mass storage solution, which can be used to store information and/or instructions. Non-limiting examples of mass storage solutions include Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K144), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 172 communicatively couples processing resource(s) with the other memory, storage and communication blocks. Bus 172 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processing resources to software system.

Optionally, operator and administrative interfaces, e.g., a display, keyboard, and a cursor control device, may also be coupled to bus 172 to support direct operator interaction with computer system. Other operator and administrative interfaces can be provided through network connections connected through communication port 180. External storage device 170 can be any kind of external hard-drives, floppy drives, IOMEGA® Zip Drives, Compact Disc—Read Only Memory (CD-ROM), Compact Disc—Re-Writable (CD-RW), Digital Video Disk—Read Only Memory (DVD-ROM). Components described above are meant only to exemplify various possibilities. In no way should the aforementioned exemplary computer system limit the scope of the present disclosure.

While embodiments of the present disclosure have been illustrated and described, numerous modifications, changes, variations, substitutions, and equivalents will be apparent to those skilled in the art. Thus, it will be appreciated by those of ordinary skill in the art that the diagrams, schematics, illustrations, and the like represent conceptual views or processes illustrating systems and methods embodying various non-limiting examples of embodiments of the present disclosure. The functions of the various elements shown in the figures may be provided through the use of dedicated hardware as well as hardware capable of executing associated software Similarly, any switches shown in the figures are conceptual only. Their function may be carried out through the operation of program logic, through dedicated logic, through the interaction of program control and dedicated logic, or even manually, the particular technique being selectable by the entity implementing the particular embodiment. Those of ordinary skill in the art further understand that the exemplary hardware, software, processes, methods, and/or operating systems described herein are for illustrative purposes and, thus, are not intended to be limited to any particular named. While the foregoing describes various embodiments of the disclosure, other and further embodiments may be devised without departing from the basic scope thereof.

Figure 2:
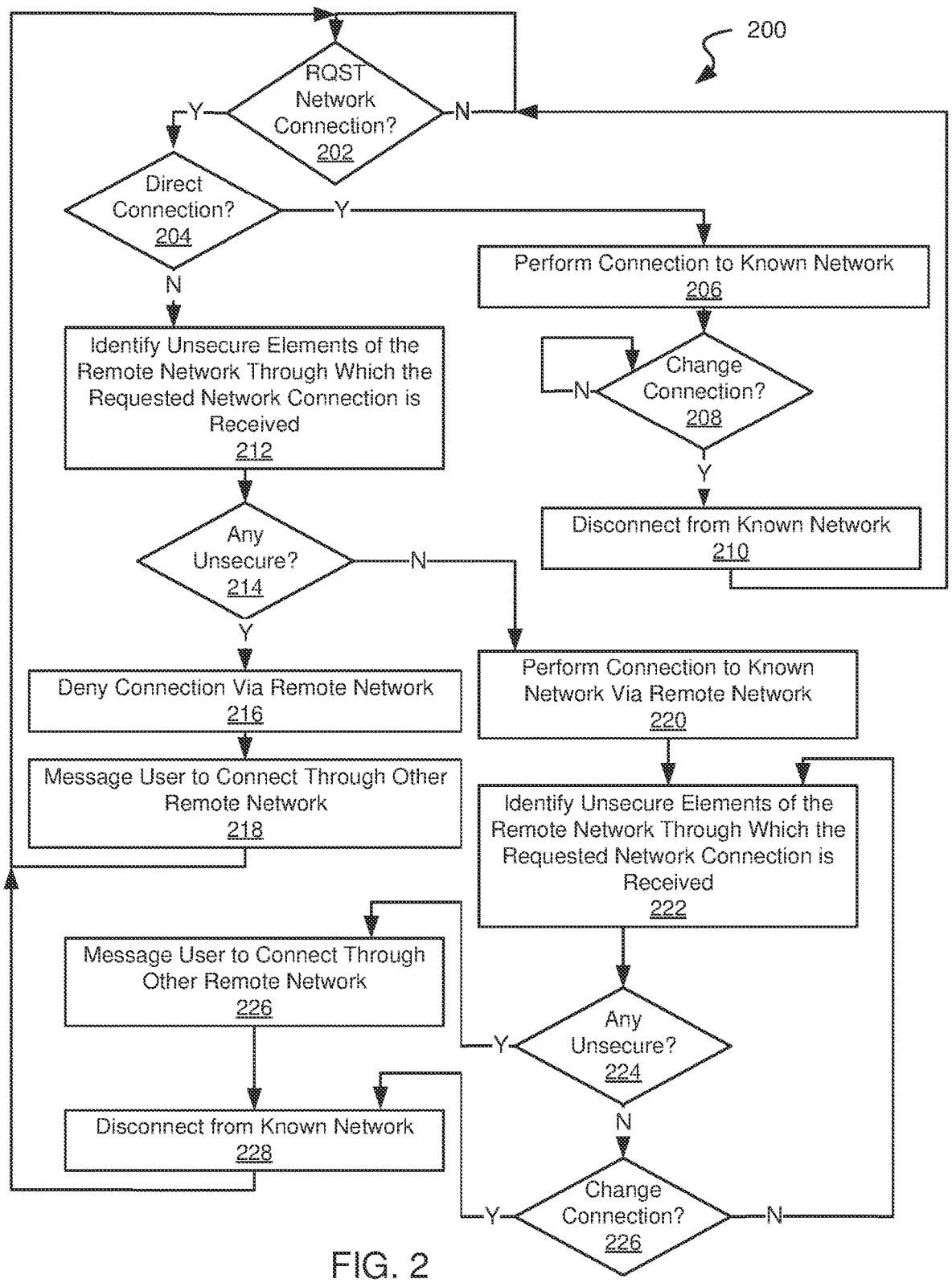
FIG. 2 is a flow diagram showing a method in accordance with various embodiments for determining a potential network security issues and denying access based upon the potential network insecurity.

Turning to FIG. 2, a flow diagram 200 shows a method in accordance with various embodiments for determining a potential network security issues. Following flow diagram 200, it is determined whether a request to access a known network is received (block 202). This is determined by a module operating on the known access device that is configured to detect a request to access a particular network. In some cases, such a request includes preparing an authorization credential that will be presented to the known network as part of requesting access.

It is determined whether the requested connection will result in a direct connection to the known network, or whether the request connection will be made via a remote network (block 204). Where the attempted connection to known network 102 is behind a secure gateway (i.e., is on-network), the user or the devices has been authenticated against a AAA server (i.e., an authentication server) or is otherwise accessing from within the known network (i.e., a direct connection) (block 204), the authorization credential for the known network is provided from the known access device to the network gateway of the known network. Where the authorization is correct, the known network and the known access device perform a connection to the known network (block 206). It is noted that in some cases where the authorization credential fails the known access device may be granted a limited access connection (e.g., access to only unsecured network accessible resources) on the known network.

The known access device is allowed continual access to the known network until a change in the network connection is detected (block 208). Such a change in network connection can include, but is not limited to, any process of disconnecting the known access device from the known network. Once a change in network connection is detected (block 208), the known access device is disconnected (or otherwise isolated) from the known network (block 210). To the extent the connection between the known access device and the known network is to be renewed, the processes of blocks 202 et seq. are repeated.

Alternatively, where the attempted connection to the known network is via a remote network (i.e., an indirect connection) (block 204), a module executing on the known access device scans the remote network through which the known access device is requesting connection to the known network for unsecure network elements (block 212). Such unsecure network elements may be any network element that is not identified by the module as "acceptably secure". Such acceptably secure network elements are also referred to herein as type II network elements. In contrast, network elements that are not specifically designated as acceptably secure are referred to herein as type I network elements. What network elements are considered acceptably secure may be designated by a network administration of the known network and programmed into the module executing on the known access device. This functions similar to a "whitelist" of network elements. In some embodiments, one or more types of network printers and/or one or more types of network scanners may be considered acceptably secure, and in the same embodiment, all other network elements are not considered acceptably secure.

Any network elements on the remote network through which the known access device is attempting to access the known network that are not identified as acceptably secure in the module executing on the known access device are designated as "unsecure" network elements. It is determined whether any unsecure network elements are included in the remote network through which the known access device is attempting to access the known network (block 214). Where no unsecure network elements are included (block 214), the authorization credential for the known network is provided from the known access device to the network gateway of the known network. Where the authorization is correct, the known network and the known access device perform a connection to the known network (block 220). Again, it is noted that in some cases where the authorization credential fails the known access device may be granted a limited access connection (e.g., access to only unsecured network accessible resources) on the known network.

The known access device is allowed continual access to the known network via the remote network until a change in the network connection is detected. Such a change in network connection can include, but is not limited to, addition of an unsecure network element to the remote network (blocks 222-224) or a change in connection to the known network (block 226). Such a change in connection may be, but is not limited to, any process of disconnecting the known access device from the known network. Once a change in network connection is detected (block 226), the known access device is disconnected from the known network (block 228). To the extent the connection between the known access device and the known network is to be renewed, the processes of blocks 202 et seq. are repeated.

The module executing on the known access device that is responsible for identifying unsecure network elements (block 222) continues to operate while known access device is connected to the known network via the remote network. Where it is found that any unsecure network element has been added to the remote network (block 224), a message is displayed to a user of the known access device requesting that they reconnect via another remote network that does not include any unsecure network elements (block 226) and the known access device is disconnected from the known network (block 228). To the extent the connection between the known access device and the known network is to be renewed, the processes of blocks 202 et seq. are repeated.

Alternatively, where it is determined that unsecure network elements are included in the remote network through which the known access device is attempting to access the known network (block 214), a connection of the known access device to the known network via the remote network is denied (block 216) and a message is displayed to a user of the known access device requesting that they reconnect via another remote network that does not include any unsecure network elements (block 218).

Figure 3:
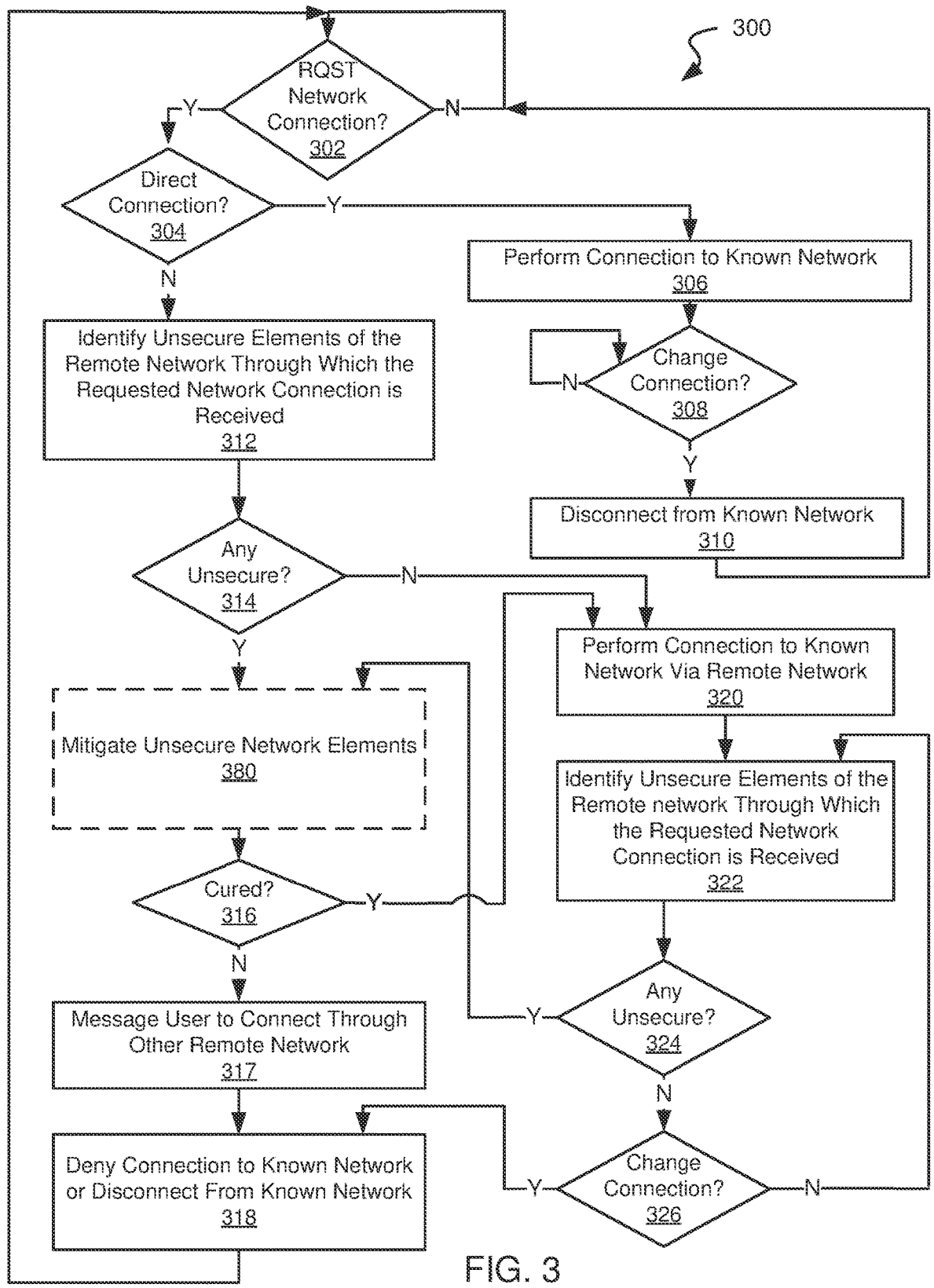
FIG. 3 is a flow diagram showing a method in accordance with some embodiments for determining potential network security issues and attempting to mitigate the potential network insecurity.

Turning to FIG. 3, a flow diagram 300 shows a method in accordance with various embodiments for determining potential network security issues and attempting to mitigate the potential network security issues. Following flow diagram 300, it is determined whether a request to access a known network is received (block 302). This is determined by a module operating on the known access device that is configured to detect a request to access a particular network. In some cases, such a request includes preparing an authorization credential that will be presented to the known network as part of requesting access.

It is determined whether the requested connection will result in a direct connection to the known network, or whether the request connection will be made via a remote network (block 304). Where the attempted connection to the known network is via a network gateway in the known network (i.e., a direct connection) (block 304), the authorization credential for the known network is provided from the known access device to the network gateway of the known network. Where the authorization is correct, the known network and the known access device perform a connection to the known network (block 306). It is noted that in some cases where the authorization credential fails the known access device may be granted a limited access connection (e.g., access to only unsecured network accessible resources, but isolated from secure network accessible resources) on the known network.

The known access device is allowed continual access to the known network until a change in the network connection is detected (block 308). Such a change in network connection can include, but is not limited to, any process of disconnecting the known access device from the known network. Once a change in network connection is detected (block 208), the known access device is disconnected from the known network (block 310). To the extent the connection between the known access device and the known network is to be renewed, the processes of blocks 302 et seq. are repeated.

Alternatively, where the attempted connection to the known network is via a remote network (i.e., an indirect connection) (block 204), a module executing on the known access device scans the remote network through which the known access device is requesting connection to the known network for unsecure network elements (block 312). Such unsecure network elements may be any network element that is not identified by the module as acceptably secure. In some embodiments, one or more types of network printers and/or one or more types of network scanners may be considered acceptably secure, and in the same embodiment, all other network elements are not considered acceptably secure.

Any network elements on the remote network through which the known access device is attempting to access the known network that are not identified as acceptably secure in the module executing on the known access device are designated as "unsecure" network elements. It is determined whether any unsecure network elements are included in the remote network through which the known access device is attempting to access the known network (block 314). Where no unsecure network elements are included (block 314), the authorization credential for the known network is provided from the known access device to the network gateway of the known network via the remote network. Where the authorization is correct, the known network and the known access device perform a connection to the known network (block 320). Again, it is noted that in some cases where the authorization credential fails the known access device may be granted a limited access connection (e.g., access to only unsecured network accessible resources) on the known network.

The known access device is allowed continual access to the known network via the remote network until a change in the network connection is detected. Such a change in network connection can include, but is not limited to, addition of an unsecure network element to the remote network (blocks 322-324) or a change in connection to the known network (block 326). Such a change in connection may be, but is not limited to, any process of disconnecting the known access device from the known network. Once a change in network connection is detected (block 326), the known access device is disconnected from the known network (block 318). To the extent the connection between the known access device and the known network is to be renewed, the processes of blocks 302 et seq. are repeated.

The module executing on the known access device that is responsible for identifying unsecure network elements (block 322) continues to operate while known access device is connected to the known network via the remote network. Where it is found that any unsecure network element has been added to the remote network (block 324), an attempt to mitigate any identified unsecure network elements (block 380). This process of mitigation and follow on processes are discussed more fully below.

Alternatively, where it is determined that unsecure network elements are included in the remote network through which the known access device is attempting to access the known network (block 314), an attempt is made to mitigate the security issues resulting from the unsecure network elements (block 380). Block 380 is shown in dashed lines as it may be done using a number of different processes. Examples of such mitigation processes are discussed below in relation to FIGS. 4-6. The mitigation process of block 380 may include any one of the processes discussed below in relation to FIGS. 4-6, combinations of two or more of the processes discussed below in relation to FIGS. 4-6, and/or other processes for reducing or eliminating a potential security threat caused by an identified unsecure network element on the remote network. Based upon the disclosure provided herein, one of ordinary skill in the art will recognize other possible mitigation processes that may be used in relation to different embodiments.

It is determined whether the attempt to mitigate the identified unsecure network elements worked (block 316). The attempt to mitigate may be considered to have worked where, for example, the unsecure network element is removed from the remote network, a virtual private network (VPN) is implemented between the known access device and the known network (i.e., the VPN application is installed and running on the known access device and network traffic is being routed via the VPN application), and/or the status of the identified unsecure network element(s) is/are changed from unsecure to secure. This change in status of an unsecure network element to a secure network element may include, but is not limited to, the network administration of the known network identified the unsecure network element as a type II network element instead of a type I network element, and/or adding updated password protection to allow access to the unsecure network element. Based upon the disclosure provided herein, one of ordinary skill in the art will recognize a variety of ways and reasons for modifying the status of an unsecure network element.

Where all of the security issues for the identified unsecure network element(s) are cured or remediated (block 316), the processes of blocks 320 et seq. are performed. Alternatively, where less than all of the security issues for the identified unsecure network element(s) are cured (block 316), a message is displayed to a user of the known access device requesting that they reconnect via another remote network that does not include any unsecure network elements (block 317) and the connection to the known network is either denied (i.e., when the connection between the known access device and the known server had not yet been established) or the connection is terminated (i.e., when the connection between the known access device and the known server had previously been established).

Figure 4:
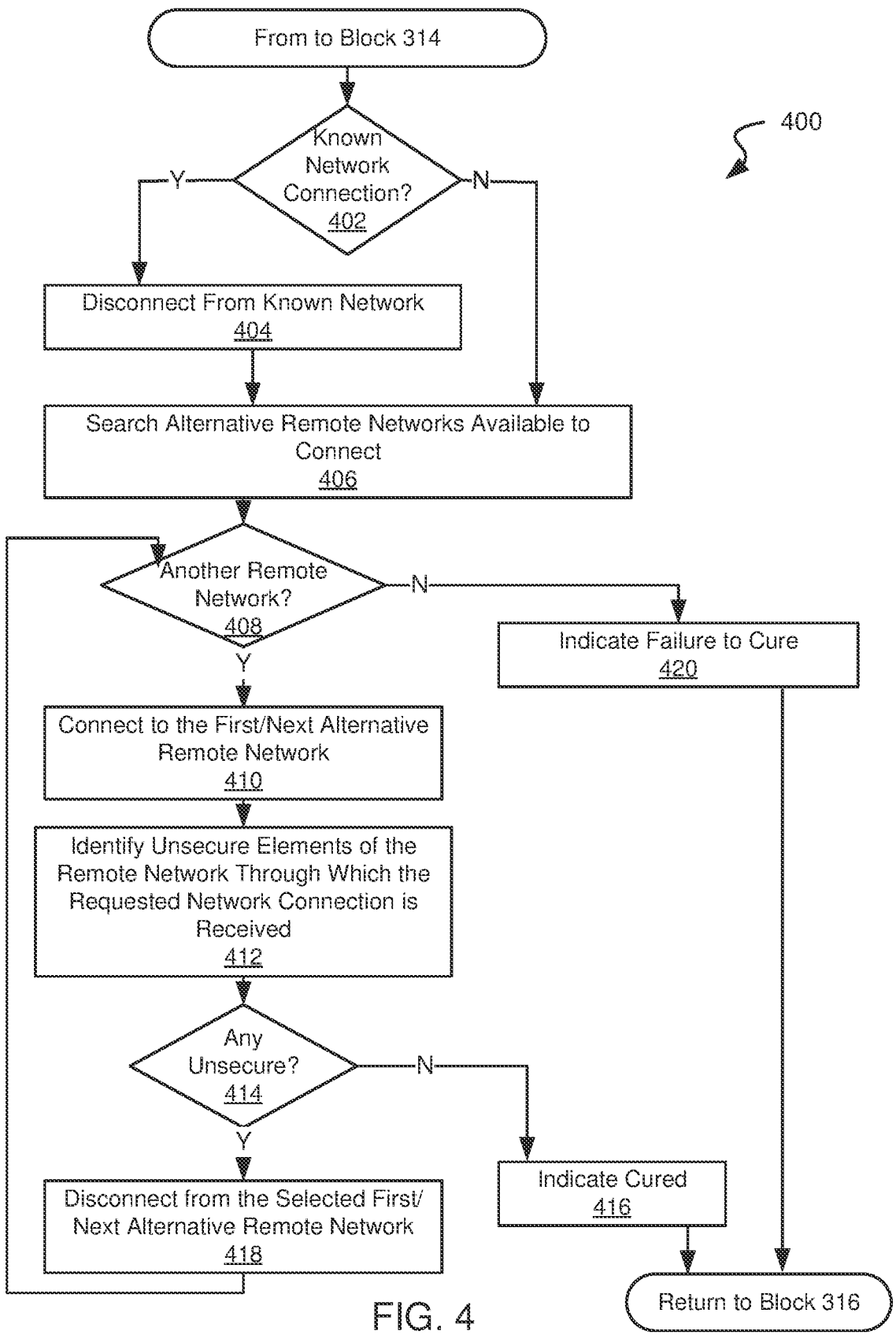
FIG. 4 is a flow diagram showing a method for mitigating potential network security issues in accordance with some embodiments.

Turning to FIG. 4, a flow diagram 400 shows a method for mitigating a potential network security issue in accordance with some embodiments. Following flow diagram 400, upon identifying an unsecure network element (i.e., block 314 of FIG. 3), it is determined whether a connection has already been established between the known access device and the known network (block 402). Where a connection was previously established (block 402), the secure network device is disconnected from the known network (block 404). In any case of whether a previous connection between the secure network device and the known network existed (block 402), a module executing on the known access device scans for other remote networks available to the known access device (block 406).

Where no other remote networks are available to the known access device (block 408), a failure to cure or remediate the identified unsecure network element(s) is indicated (block 420) and the processing is returned to block 316 of FIG. 3. Alternatively, where another remote network is available to the known access device (block 408), a connection is made to the next alternative remote network (bock 410). A module executing on the known access device scans the remote network through which the known access device is requesting connection to the known network for unsecure network elements (block 412). Such unsecure network elements may be any network element that is not identified by the module as acceptably secure. In some embodiments, one or more types of network printers and/or one or more types of network scanners may be considered acceptably secure, and in the same embodiment, all other network elements are not considered acceptably secure.

It is determined whether any unsecure network elements are included in the remote network through which the known access device is attempting to access the known network (block 414). Where no unsecure network elements are included (block 414), an indication that the identified unsecure network elements have been cured is provided (block 416) and the processing is returned to block 316 of FIG. 3. Alternatively, where any unsecure network elements are identified in the remote network (block 414), known access device is disconnected from the selected remote network (block 418) and the processes of blocks 408 et seq. are repeated.

Figure 5:
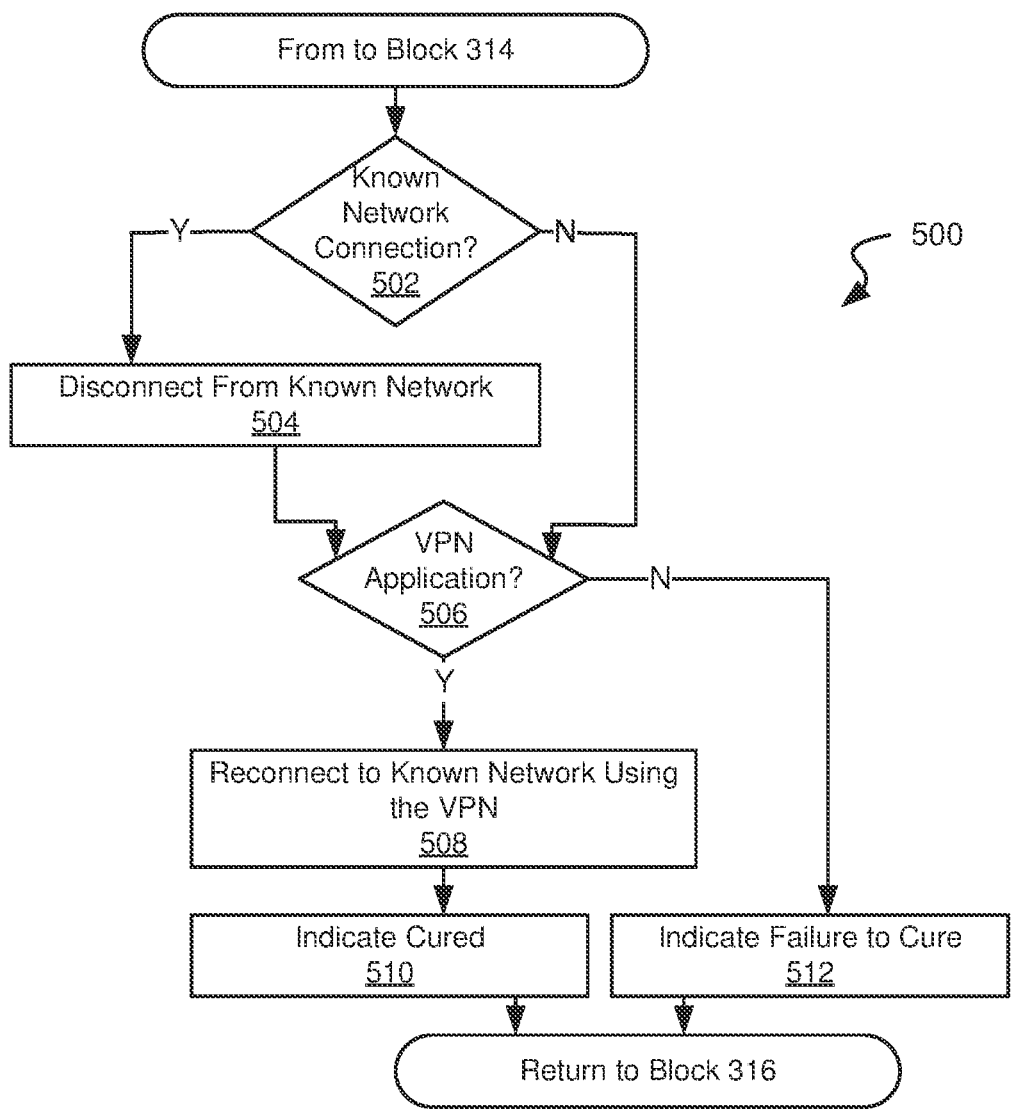
FIG. 5 is a flow diagram showing another method for mitigating a potential network security issues in accordance with other embodiments.

Turning to FIG. 5, a flow diagram 500 shows another method for mitigating potential network security issues in accordance with other embodiments. Following flow diagram 500, upon identifying an unsecure network element (i.e., block 314 of FIG. 3), it is determined whether a connection has already been established between the known access device and the known network (block 502). Where a connection was previously established (block 502), the secure network device is disconnected from the known network (block 504). In any case of whether a previous connection between the secure network device and the known network existed (block 502), it is determined whether a VPN application is available on the known access device (block 506). Where a VPN application does not exist (block 506), a failure to cure the identified unsecure network element(s) is indicated (block 512) and the processing is returned to block 316 of FIG. 3.

Alternatively, where a VPN application exists on the known access device (block 506), the VPN application is invoked and the known access device is reconnected to the known network via the remote network using VPN functionality (i.e., the VPN application is running on the known access device and network traffic is being routed via the VPN) (block 508). As a secure link is available that avoids the unsecure network elements on the remote network, a cure of the identified unsecure network elements is indicated (block 510) and the processing is returned to block 316 of FIG. 3.

Figure 6:
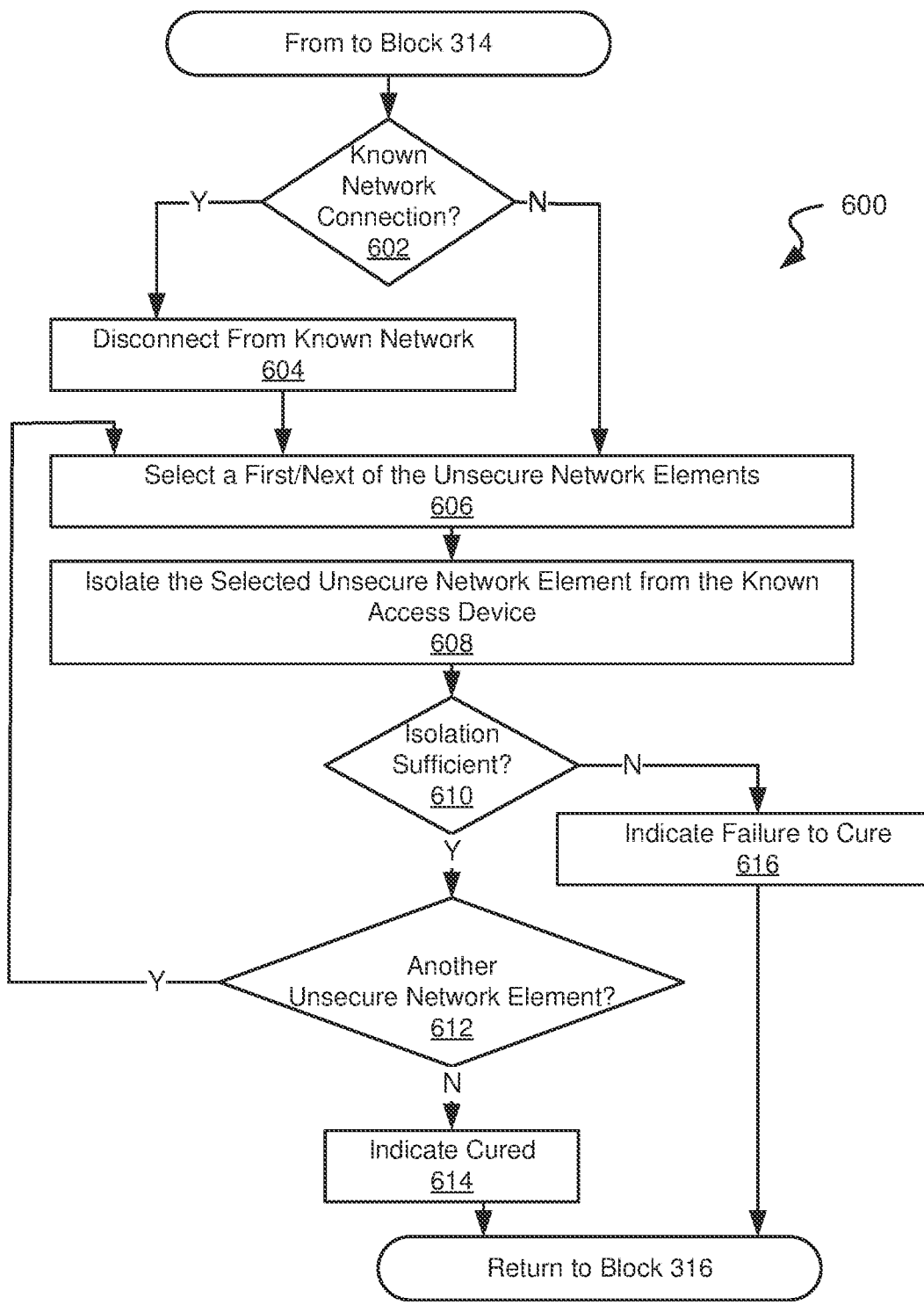
FIG. 6 is a flow diagram showing yet another method for mitigating potential network security issues in accordance with yet other embodiments.

Turning to FIG. 6, a flow diagram 600 shows yet another method for mitigating potential network security issues in accordance with yet other embodiments. Following flow diagram 600, upon identifying an unsecure network element (i.e., block 314 of FIG. 3), it is determined whether a connection has already been established between the known access device and the known network (block 602). Where a connection was previously established (block 602), the secure network device is disconnected from the known network (block 604). In any case of whether a previous connection between the secure network device and the known network existed (block 602), a first/next of the identified unsecure network elements is selected (block 606).

A module executing on the known access device isolates the known access device from the selected unsecure network element (block 608). It is determined whether the isolation was sufficient to protect the known network (block 610). Where the isolation was not sufficient (block 610), a failure to cure the identified unsecure network element(s) is indicated (block 616) and the processing is returned to block 316 of FIG. 3.

Alternatively, where the block was sufficient (block 610), it is determined whether another identified unsecure network element remains to be processed (block 612). Where another unsecure network element remains (block 612), the processes of blocks 606 et seq. are performed for the next unsecure network element. Alternatively, where no other unsecure network elements remain to be processed (block 612), a cure of the identified unsecure network elements is indicated (block 614) and the processing is returned to block 316 of FIG. 3.

In conclusion, the present invention provides for novel systems, devices, and methods. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A non-transitory computer-readable storage medium embodying instructions, which when executed by one or more processing resources of a secure corporate access device, representing a known access device to a corporate network, causes the secure corporate access device to:
   receive a request to access the corporate network, representing a known network to the secure corporate access device;
   based on a determination that the requested access will result in an indirect connection from the secure corporate network access device to the corporate network from a remote network through which the secure corporate access device is coupled to the corporate network, identify whether the remote network includes one or more unsecure network elements by scanning the remote network;
   based on an unsecure network element being identified on the remote network as a result of the scanning;
   deny the request to access the corporate network; and
   mitigate a security issue of the unsecure network element by coupling the secure corporate access device in communication with the corporate network through another remote network; and
   based on no unsecure network elements being identified on the remote network as a result of the scanning, request a grant of access from the corporate network to the secure corporate access device.

2. The non-transitory computer-readable storage medium of claim 1, wherein access by the secure corporate access device to the corporate network is granted upon a combination of the requested grant of access and a correct authorization credential presented by the secure corporate access device to the corporate network.

3. The non-transitory computer-readable storage medium of claim 1, wherein the unsecure network element comprises an Internet of Things (IOT) device.

4. The non-transitory computer-readable storage medium of claim 1, wherein administration of the secure corporate access device and the corporate network is controlled by a common administration entity.

5. The non-transitory computer-readable storage medium of claim 1, wherein the instructions further cause the secure corporate access device to after denial of access to the corporate network, provide a message to a user of the secure corporate access device, to access the corporate network via another remote network.

6. The non-transitory computer-readable storage medium of claim 1, wherein the instructions further cause the secure corporate access device to:
based on mitigation of the security issue, request access to the corporate network.

7. The non-transitory computer-readable storage medium of claim 1, wherein the instructions further cause the secure corporate access device to start a virtual private network application on the secure corporate access device, and wherein access to the corporate network is requested via a virtual private network.

8. The non-transitory computer-readable storage medium of claim 1, wherein the instructions further cause the secure corporate access device to:
use a network connection between the secure corporate access device and the corporate network; and
while using the network connection between the secure corporate access device and the corporate network, periodically scan the remote network through which access to the corporate network is established, to identify existence of any unsecure network elements on the remote network.

9. The non-transitory computer-readable storage medium of claim 8, wherein the instructions further cause the secure corporate access device to after identification of an unsecure network element on the remote network as a result of the periodic scan while using the network connection between the secure corporate access device and the corporate network, disconnect the secure corporate access device from the corporate network.

10. The non-transitory computer-readable storage medium of claim 9, wherein the instructions further cause the secure corporate access device to after disconnection of the secure corporate access device from the corporate network, provide a message to a user of the secure corporate access device requesting the user to access the corporate network via another remote network.

11. A method comprising:
receiving, by secure corporate access device, representing a known access device to a corporate network, a request to access the corporate network, representing a known network to the secure corporate access device;
based on a determination that the requested access will result in an indirect connection from the secure corporate network access device to the corporate network from a remote network through which the secure corporate access device is coupled to the corporate network, identifying, by the secure corporate access device, whether the remote network includes one or more unsecure network elements by scanning the remote network;
based on an unsecure network element being identified on the remote network as a result of the scanning;
denying the request to access the corporate network; and
mitigating a security issue of the unsecure network elements by coupling the secure corporate access device in communication with the corporate network through another remote network; and
based on no unsecure network elements being identified on the remote network as a result of the scanning, requesting, by the secure corporate access device, a grant of access from the corporate network to the secure corporate access device.

12. The method of claim 11, wherein access by the secure corporate access device to the corporate network is granted upon a combination of the requested grant of access and a correct authorization credential presented by the secure corporate access device to the corporate network.

13. The method of claim 11, wherein the unsecure network element comprises an Internet of Things (IOT) device.

14. The method of claim 11, wherein administration of the secure corporate access device and the corporate network is controlled by a common administration entity.

15. The method of claim 11, further comprising after denying access to the corporate network by the secure corporate access device, providing, by the secure corporate access device, a message to a user of the secure corporate access device, to access the corporate network via said another remote network.

16. The method of claim 11, further comprising:
based on mitigation of the security issue, requesting, by the secure corporate access device, access to the corporate network.

17. The method of claim 11, wherein said mitigating the security issue of the unsecure network element includes further comprising:
starting, by the secure corporate access device, a virtual private network application on the secure corporate access device, and wherein said requesting, by the secure corporate access device, access to the corporate network is done over a virtual private network.

18. A secure corporate access device comprising:
one or more processing resources;
a non-transitory computer-readable medium coupled to the one or more processing resources and having stored therein instructions that when executed by the one or more processing resources cause the secure corporate access device to:
receive a request to access the corporate network, representing a known network to the secure corporate access device;
based on a determination that the requested access will result in an indirect connection from the secure corporate network access device to the corporate network from a remote network through which the secure corporate access device is coupled to the corporate network, identify whether the remote network includes one or more unsecure network elements by scanning the remote network;
based on an unsecure network element being identified on the remote network as a result of the scanning;
deny the request to access the corporate network; and
mitigate a security issue of the unsecure network element by coupling the secure corporate access device in communication with the corporate network through another remote network; and
based on no unsecure network elements being identified on the remote network as a result of the scanning, request a grant of access from the corporate network to the secure corporate access device.

19. The secure corporate access device of claim 18, wherein the instructions further cause the secure corporate access device to after denial of access to the corporate network, provide a message to a user of the secure corporate access device, to access the corporate network via said another remote network.

20. The secure corporate access device of claim 18, wherein the instructions further cause the secure corporate access device to:
  based on mitigation of the security issue of the unsecure network element, request access to the corporate network.

21. The secure corporate access device of claim 20, wherein the instructions further cause the secure corporate access device to:
  start a virtual private network application on the secure corporate access device, and wherein access to the corporate network is requested via a virtual private network.

* * * * *